United States Patent [19]

Urban et al.

[11] Patent Number: 5,024,041
[45] Date of Patent: Jun. 18, 1991

[54] PROCESS FOR FILLING TUBULAR CASINGS

[75] Inventors: Rudolf Urban; Josef Fritsch, both of Taunusstein; Klaus-Peter Schoen, Wiesbaden, all of Fed. Rep. of Germany

[73] Assignee: Hoechst Aktiengesellschaft, Frankfurt am Main, Fed. Rep. of Germany

[21] Appl. No.: 345,182

[22] Filed: May 1, 1989

[30] Foreign Application Priority Data

May 6, 1988 [DE] Fed. Rep. of Germany ... 8806038[U]

[51] Int. Cl.$^5$ .................. B65B 11/58; B65B 9/12; A22C 11/00
[52] U.S. Cl. .................. 53/449; 53/459; 53/170; 53/576; 452/35; 452/32
[58] Field of Search .................. 17/1 F, 35, 42, 49; 53/170, 172, 574, 575, 576, 577, 449, 459, 450

[56] References Cited

U.S. PATENT DOCUMENTS

| | | | |
|---|---|---|---|
| 1,505,218 | 8/1924 | Sartore | 17/45 |
| 2,922,186 | 1/1960 | Sartore | 17/45 |
| 3,751,764 | 8/1973 | Dobbert | 17/35 |
| 4,466,984 | 8/1984 | Kupcikevicius | 17/49 X |
| 4,551,884 | 11/1985 | Kupcikevicius et al. | 17/35 X |
| 4,590,830 | 5/1986 | Duroyon et al. | 17/49 |
| 4,621,392 | 11/1986 | Raudys | 17/49 |
| 4,688,299 | 8/1987 | Frey et al. | 17/49 |
| 4,734,956 | 4/1988 | Frey et al. | 53/576 X |

FOREIGN PATENT DOCUMENTS

| | | |
|---|---|---|
| 0171849 | 2/1986 | European Pat. Off. . |
| 0175173 | 3/1986 | European Pat. Off. . |
| 0247462 | 12/1987 | European Pat. Off. . |
| 2645714 | 11/1977 | Fed. Rep. of Germany .......... 17/35 |
| 3401204 | 7/1984 | Fed. Rep. of Germany .......... 17/35 |
| 3525587 | 2/1986 | Fed. Rep. of Germany .......... 17/35 |
| 8701006 | 4/1987 | Fed. Rep. of Germany . |
| 3600818 | 7/1987 | Fed. Rep. of Germany . |
| 8705899.5 | 7/1987 | Fed. Rep. of Germany . |
| 8805545 | 8/1988 | Fed. Rep. of Germany . |
| 1159907 | 7/1958 | France .................. 53/576 |
| 542751 | 11/1973 | Switzerland . |
| 1443487 | 11/1974 | United Kingdom . |

*Primary Examiner*—Robert L. Spruill
*Assistant Examiner*—Beth Bianca
*Attorney, Agent, or Firm*—Foley & Lardner

[57] ABSTRACT

A device for filling a tubular casing with a pasty product comprising a stuffing horn, a brake which encircles the outside of the stuffing horn in the vicinity of the orifice thereof, and a coaxial, cylindrical support tube accommodating a tubular net, which support tube is arranged at a distance from the outside of the stuffing horn and extends over the length of the stuffing horn to an end in the vicinity of the orifice of the stuffing horn, the brake being located at said end of the support tube. The invention enables the tubular net to continuously applied to the tubular casing during the stuffing operation.

4 Claims, 1 Drawing Sheet

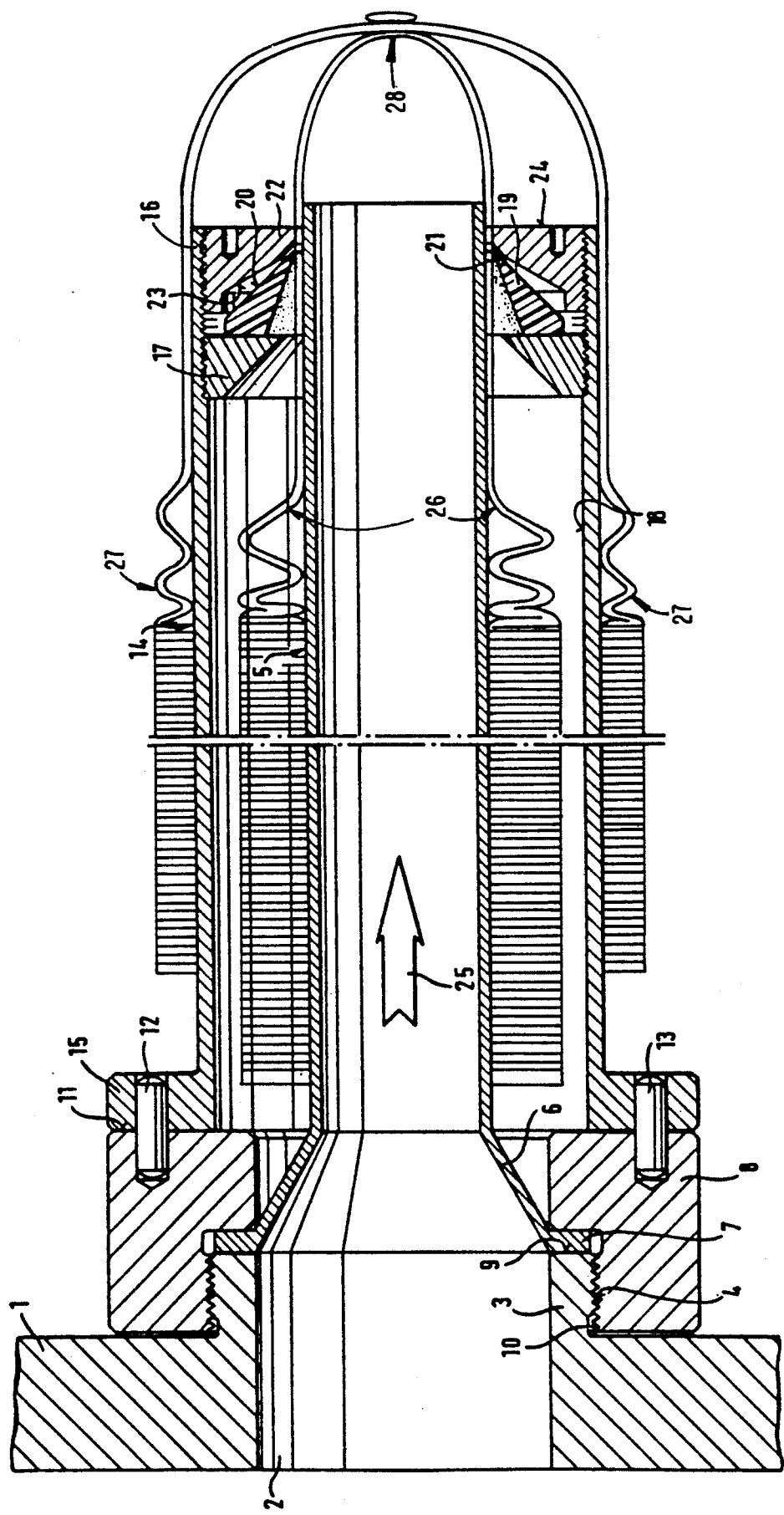

PROCESS FOR FILLING TUBULAR CASINGS

BACKGROUND OF THE INVENTION

The present invention relates to a device for filling tubular casings with a pasty product, in particular, for stuffing artificial sausage casings with sausage meat. Such devices comprise a container for the pasty product to be packaged. A funnel is usually provided at the top of the container through which the container is loaded with the pasty product.

In the stuffing operation, the product to be packaged is pressed from the container through a stuffing horn into the tubular casing. The casing to be filled is mounted on the stuffing horn in a shirred form, as a so-called "shirred stick", and is subsequently deshirred by the product pressed into it and then pulled away from the stuffing horn. In order to stuff the casing tightly and in a crease-free manner with the pasty product, it is necessary to retard the removal of the casing from the stuffing horn by means of a brake. The brake is disposed in the vicinity of the orifice of the stuffing horn and urges the deshirred tubular casing with adjustable force against the outside of the stuffing horn.

The presently known devices of this kind are not adapted for applying a tubular net to the outside surface of the tubular casing filled with the product, simultaneously with the stuffing operation. Therefore, a net is usually only applied to the ready-filled casing.

SUMMARY OF THE INVENTION

Accordingly, it is an object of the present invention to provide a device for filling tubular casings which enables continuous application of a tubular net to a tubular casing during the course of the stuffing operation.

In accomplishing the foregoing objectives, there has been provided, in accordance with one aspect of the present invention, a device for filling a tubular casing with a pasty product and simultaneously applying a tubular net thereto, which comprises a stuffing horn comprising an orifice, a support tube for a tubular net, said tube comprising an end in the vicinity of the orifice and coaxially surrounding the stuffing horn, and a brake, disposed in the vicinity of the orifice, which encircles the stuffing horn.

In a preferred embodiment, the brake comprises an annular stop stationarily disposed within the support tube, a pressing, screw, disposed within the support tube adjacent the end, which comprises an external thread, whereby the pressing screw engages an internal thread of the support tube, and an outer end face comprising means for axially displacing the pressing screw, and a brake ring disposed within the support tube between the annular stop and the pressing screw, which is displaceable towards the annular stop and in the direction of the outer surface of the stuffing horn upon axial displacement of the pressing screw.

In accordance with another aspect of the present invention there is provided a process for filling tubular casings employing the device recited above.

In accordance with yet another aspect of the present invention, there is provided a sausage product produced by the recited process.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWING

The invention may be more readily understood by referring to the accompanying drawing which shows a preferred embodiment of the filling device in a lateral sectional view.

DETAILED DESCRIPTION OF PREFERRED EMBODIMENTS

According to the invention, the device comprises a cylindrical support tube for the tubular net. The support tube surrounds the outside of the stuffing horn in a coaxial position and has approximately the same length as the stuffing horn. Just as the stuffing horn, the support tube is, at one end thereof, fastened or detachably connected to the container or a container member of the filling device. The opposite end of the support tube is in the vicinity of the orifice of the stuffing horn, through which the product to be packaged is pressed into the casing in the stuffing operation. The distance between the outside of the stuffing horn and the internal wall of the support tube is, at practically any point, equal in size and is dimensioned to accommodate the shirred tubular casing to be filled.

The brake, which retards the removal of the tubular casing from the stuffing horn during the stuffing operation comprises a flexible brake ring which surrounds the stuffing horn to form a circular ring-shaped gap between the brake ring and the outside of the stuffing horn, through which gap the deshirred tubular casing is pulled off in the course of stuffing. With the aid of appropriate elements, the brake ring is urged against the deshirred casing with adjustable force. As this force increases, the casing is retained more firmly, removed more slowly by the product pressed into it, and expanded to a higher degree under the stuffing pressure. This variable retaining force thus makes it possible to adjust the filling diameter of the casing.

A brake of this kind is described, for example, in DE-U 87 05 899.5. This brake comprises a flexible brake ring with a ring nut arranged behind it, which is axially displaceable on the stuffing horn. By means of this ring nut, the brake ring can be pushed, in the stuffing direction, against an annular stop fixed in front of it.

These three structural elements, which also form the brake according to the present invention, namely brake ring, axially displaceable ring element and annular stop, are mounted right at the end of the support tube, in the vicinity of the orifice of the stuffing horn. The outer circumference of the three brake elements must, in each case, be selected to be so small that the tubular net running off from the support tube during the filling operation is pulled over the outside of these elements without difficulty. In practice, this outer circumference, therefore, does not exceed the outer circumference of the support tube. This is necessary, since the tubular net, other than the tubular casing, is not passed through the annular internal bores of the elements forming the brake.

For reasons of construction, it is, however, preferred to dispose the complete brake in the interior of the support tube. In order to be able to vary the retaining force of the brake, it is then advisable to arrange a stationary annular stop behind the brake ring, in place of the axially displaceable ring nut shown in DE-U 87 05 899.5 and to provide an axially displaceable ring element in front of the brake ring, in place of an annular stop located in the vicinity of the orifice of the stuffing horn.

Instead of a ring nut, an annular stop is therefore arranged behind the brake ring, in the interior of the support tube and is fixedly connected with the internal wall of the support tube. The annular stop has a central circular bore, the diameter of which is larger than the outside diameter of the stuffing horn. The annular stop surrounds the outside of the stuffing horn. Between the internal bore of the annular stop and the outside of the stuffing horn a circular ring-shaped gap is formed, through which the deshirred tubular casing can pass substantially without friction.

For the annular stop according to DE-U 87 05 899.5 an axially displaceable, pressing screw is substituted according to the present invention, which is disposed at the opening of the support tube and urges the brake ring in the interior of the support tube, counter to the stuffing direction, against the annular stop fixed behind the brake ring inside the support tube. In a preferred embodiment, the pressing screw is also located entirely inside the support tube and can be displaced in the axial direction by means of an external thread on its circular outer circumference, which is screwed into a thread on the internal wall of the support tube.

In order for the brake ring to be pushed in the direction of the outside of the stuffing horn and thus against the casing, as a result of the pressing force exerted by the pressing screw, the surface of the brake ring preferably has the known shape of a truncated cone and ends in an annular braking lip in the vicinity of the outside of the stuffing horn and adjacent to the pressing screw. The pressing screw preferably has a lateral surface that is inclined towards the surface in the shape of a truncated cone of the brake ring, similarly to the lateral surface present in the annular stop according to DE-U 87 05 899.5. The internal cavity of the pressing screw preferably has the form of a circular cylinder or circular ring. Its diameter is not more than a few millimeters, preferably 1 to 4 mm, larger than the outside diameter of the stuffing horn. Together with the outside of the stuffing horn, the internal cavity of the pressing screw forms a circular ring-shaped passage for the deshirred casing.

In the outer end face of the pressing screw, which is accessible from the outside through the opening of the support tube in the vicinity of the orifice of the stuffing horn, means for axially displacing the pressing screw in the thread on the internal wall of the support tube are provided. These means preferably comprise recesses that can be engaged by a suitable wrench. By turning the pressing screw with this wrench, it is urged, counter to the stuffing direction, against the brake ring which, in turn, is pushed against the annular stop.

Referring now to the drawing, the filling device comprises a container for the product to be packaged. The container wall 1 has an opening 2 with an annular neck 3 showing an external thread 4. A stuffing horn 5 is fixed to the end face 9 of the neck 3, by means of a nut 8 via its funnel-shaped end 6 that is enlarged to form a circular ring-shaped flange rim 7. The internal thread 10 of the nut 8 is screwed upon the external thread 4 of the neck 3. Centering pins 12, 13 are present in the flat side 11 of the nut 8. These centering pins 12, 13 maintain a support tube 14 in a coaxial position relative to the stuffing horn 5; they penetrate the outwardly projecting circular ring-shaped flange rim 15 of the support tube 14. The flange rim 15 is fastened to the nut 8, by means of fixing elements, for example, screws or clamps, which are not visible in the sectional plane shown.

An annular stop 17 that is stationarily fixed to the internal wall 18 of the support tube 14, a flexible brake ring 19, the surface 20 of which has the shape of a truncated cone and which ends in a braking lip 21, and a pressing screw 22 having a lateral surface 23 that is inclined towards the brake ring 19 and an outer end face 24 are provided at the end 16 of the support tube 14. By means of a thread on its outer circumference, the pressing screw 22 is screwed into a thread on the internal wall 18 of the support tube 14 and it can be turned and thereby displaced in the axial direction. The arrow 25 indicates the stuffing direction.

In the preferred use of the device for pressing sausage meat into an artificial sausage casing 26, a shirred tubular casing is mounted on the stuffing horn 5 and a gathered tubular net 27 is pushed onto the support tube 14. The casing 26 is passed between the surface of the stuffing horn 5 and the braking units 17, 19, 22 and, at the orifice of the stuffing horn, the casing 26 is closed by a clip 28, together with the tubular net 27 pulled over the end 16 of the support tube 14. The pressing screw 22 is turned so that it is displaced in the direction of the brake ring 19, the braking lip 21 of which is then pressed upon the outer surface of the casing which, in turn, is urged against the surface of the stuffing horn 5. Through the opening 2 in the container wall 1 sausage meat enters under pressure into the stuffing horn 5 and, through the orifice of the stuffing horn, into the tubular casing 26. As a result of the retaining force exerted by the braking lip 21, the casing 26 is expanded by the pressed-in sausage meat and tightly filled. When the desired length of sausage has been reached, a second clip is attached, which closes the tubular casing 26 and simultaneously fixes the tubular net 27. As at the forward end of the sausage, the clip thus encloses the sausage meat within the casing 26 and also the surrounding tubular net 27.

What is claimed is:

1. A process for filling a tubular casing with a pasty product and simultaneously applying a tubular net thereto, which comprises the steps of mounting a tubular casing on a stuffing horn which includes an orifice and an outer surface, mounting a tubular net on a support tube having an end in the vicinity of said orifice and coaxially surrounding said stuffing horn, passing a first end of said casing between a brake and said outer surface of said stuffing horn, wherein said brake is disposed entirely within the interior of said support tube in the vicinity of said orifice and encircles said stuffing horn, pulling a first end of said tubular net over the end of said support tube, closing said first end of said casing, together with said first end of said tubular net, at said orifice, introducing a pasty product into said stuffing horn, extruding said pasty product through said stuffing horn into a length of said casing, and closing said casing together with said tubular net at a point defined by said length of said casing.

2. A process as claimed in claim 1, further comprising the step of axially displacing a pressing screw of a brake in the direction of a brake ring of said brake a distance sufficient to ensure substantially complete expansion of said casing by said pasty product.

3. A process as claimed in claim 1, wherein said pasty product is a sausage meat emulsion.

4. A sausage product produced by the process as claimed in claim 3.

* * * * *